A. J. SLOSSER

Jan. 17, 1928. PLASTIC COMPOSITION PRODUCT AND METHOD OF PRODUCING ARTICLES OF MANUFACTURE Re. 16,855

Original Filed April 20, 1926

Inventor
Alger J. Slosser
By Dowell & Dowell
his Attorneys

Reissued Jan. 17, 1928. Re. 16,855

UNITED STATES PATENT OFFICE.

ALGER J. SLOSSER, OF WILLIAMSPORT, PENNSYLVANIA, ASSIGNOR TO POMPEIAN FLOORING COMPANY, OF WILLIAMSPORT, PENNSYLVANIA, A CORPORATION OF PENNSYLVANIA.

PLASTIC COMPOSITION PRODUCT AND METHOD OF PRODUCING ARTICLES OF MANUFACTURE.

Original No. 1,627,296, dated May 3, 1927, Serial No. 103,330, filed April 20, 1926. Application for reissue filed December 6, 1927. Serial No. 238,196.

This invention relates to plastic compositions and more particularly to composition products for the production of flooring and various articles of manufacture. It aims to provide an improved composition product and method of working the same in the production of flooring and other articles of novel character and appearance.

One of the objects is to provide a fibroid composition that may readily be worked or fashioned into the finished product which will be characterized by resilient qualities, such as possessed for example by a block of wood, as distinguished from the hard and inflexible product of the ordinary mineral compositions for artificial stone and which will nevertheless possess the necessary enduring and wearing qualities without brittleness.

Another object is to provide a composition and method of producing flooring and other articles of manufacture, permitting a wide range of variation in form, design and coloring of finished products.

A further object is to provide a composition which when set and hardened, may be scraped and polished in a manner similar to that in which wood flooring is ordinarily treated.

Inexpense in the cost of production and the attainment of attractive effects in appearance of the finished products are still further desiderata which have been borne in mind in the perfection of my composition and method of forming or producing different articles of manufacture.

The invention will be hereinafter more particularly described with reference to the accompanying drawings and the practice thereof in the production of composition flooring, although it will be understood that the invention is applicable to other uses and the production of various other articles of manufacture.

Figure 1:
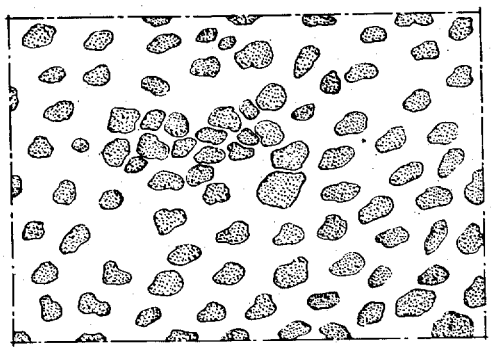
Fig. 1 is a representation of a body or slab composed of a composition embodying this invention and presenting a surface of spotted or mottled appearance.
Figure 3:
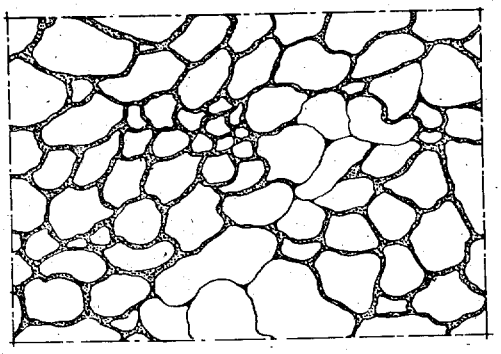
Fig. 3 is a representation of a similarly formed body or slab presenting a mottled surface of different appearance produced by fibrous concretions of larger size and the use of a coloring matter.
Figure 2:
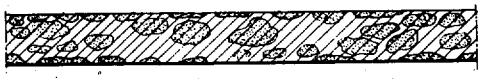
Fig. 2 is a representation of a section through the body or slab shown in Fig. 1.
Figure 4:
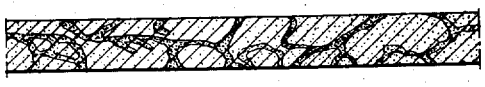
Fig. 4 is a representation of a section through the body or slab shown in Fig. 3.
Figure 5:
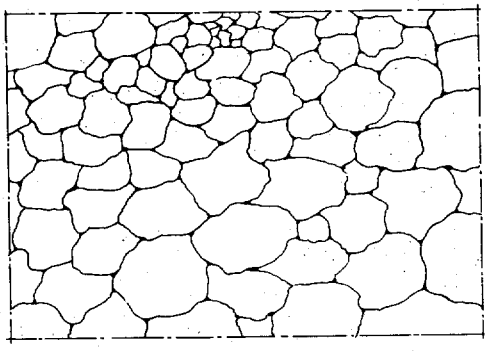
Fig. 5 is a representation of another similarly formed body or slab in which a mottled surface of more compact appearance is produced.
Figure 7:
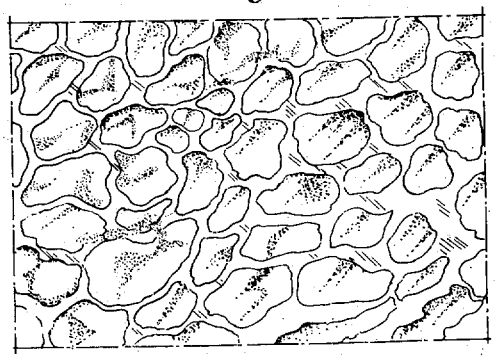
Fig. 7 is a representation of still another similarly formed body or slab presenting a mottled surface of appearance differing from the former illustrations and produced by the use of contrasting coloring matters.
Figure 6:
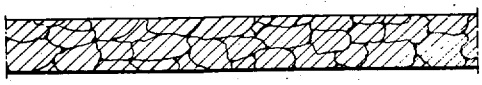
Fig. 6 is a representation of a section through the body or slab illustrated in Fig. 5.
Figure 8:
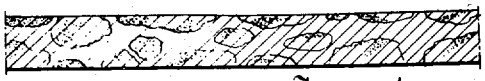
Fig. 8 is a representation of a section through the body of the material shown in Fig. 7.

My improved composition embodies different ingredients or materials mixed together in different proportions to provide a plastic or tactile mass. A vegetable fibrous material, such for instance as wood-fibre or wood-flour, is employed as the basic or principal ingredient of the composition and is mixed with the other ingredients thereof in such proportions as to provide a formative mixture or mass of relatively high fibre content. With the aforesaid fibrous ingredient or material, a mineral fibrous material such as fibered asbestos is combined, together with a binding agent or cementing material such for instance as caustic calcined magnesia of a grade equal to that used in magnesite stucco. The binding liquid which is later added to the dry materials of the composition, may be a solution of magnesium chloride.

In the practice of the invention, a practicable mixture or "mix" as it is called, which will produce desirable and very effective results, may be obtained from the following formula in which the several ingredients are given in approximate proportions by weight as follows: 45% caustic calcined magnesia, 30% white pine wood-flour, 25% asbestos lumps or floats.

The dry ingredients or materials, in proportions substantially in accordance with the above exemplary formula, are first placed together in a suitable container where initially they are thoroughly mixed in a dry state. To this dry mixture, a proper amount of the binder liquid, which in this instance is magnesium chloride preferably at a gravity of 22° Baumé q. s., is slowly added in proper proportion to produce a plastic mixture or mass in which concretions or lumps of the fibrous material are sustained. As the binder liquid is added, a chemical action takes place, causing the components of the previously dry mix to bind or come together and form multitudinous concretions or lumps of the fibrous materials, the binder solution being added slowly and a mixing being simultaneously carried on until a plastic mixture or mass composed almost entirely of these soft fibrous concretions or lumps is attained. The materials which are thus taken up by or in effect congealed and supported in the binding liquid when the latter is added, are then gently stirred or agitated until a thorough mixture and equal distribution of the floating lumps is attained throughout the plastic mass.

When working to produce a mottled effect in the surface of the resulting product, care should be taken not to make the mixture too wet as its consistency should be such that the resulting mass will be of a thick plastic character and not in the form of liquid pulp. The lumps or balls of fibrous material which are thus equally distributed throughout the supporting liquid binder, may and will vary in size and in consequence will tend to vary the size of the mottling effect produced in the finished floor or article under formation when the prepared composition is spread out or dumped into a mould.

In practicing the invention in the production of flooring, either over a relatively large area or in the form of flooring tiles, the prepared mixture or plastic mass of fibrous materials is dumped out and spread to the desired thickness over the surface to be covered, the latter having been properly prepared for the purpose. The spreading may be aided by the use of a trowel or other tool.

After being spread out over the surface with fairly uniform thickness, the plastic mass is then tamped or rolled by suitable means so that the sustained concretions or lumps of fibrous materials will be closely compacted to provide a smooth slab or flooring surface of the proper density. Should incompletely covered spots or depressions appear in the surface of the newly spread flooring after the tamping or rolling operation, they may be covered or filled up by the spreading of additional material thereover, after which the tamping or rolling operation should be repeated until the proper level and a smooth unbroken surface is obtained.

The newly spread surface is then carefully gone over with a steel trowel or other tool similarly to the manner of laying cement so that the surface may be smoothed out still further. After this operation, the newly spread surface should be allowed to stand and settle until it attains a set sufficiently hard to permit a workman to walk upon it without leaving marks in the surface thereof. The length of time required for the spread mass to set and attain the proper hardness will vary somewhat according to the surrounding atmospheric conditions, although ordinarily it would require only about eight hours.

After the floor or surface has set to the proper hardness, like that of artificial stone, it may be treated with a mechanical scraping or sanding machine, or hand scrapers of a kind ordinarily used on hardwood flooring may be used to scrape and smooth off the surface. Such a scraping or sanding operation will expose a new surface of beautifully mottled appearance, the design or character of the mottling being dependent upon and varied according to the size of the concretions or lumps of fibrous material and the coloring matter used in the composition.

Several of the many different forms or effects of mottling which may be attained in the practice of the invention have been represented in the drawings, the mottled designs or effects being variable according to the proportions of the ingredients used, the extent or thoroughness with which the fibrous materials are stirred and broken up and the coloring matters employed in the composition.

In the practice of the invention according to the method above set forth, a color or tint may be given to the finished product by the use of coloring matter in the mixture of the composition and either a blending or contrasting combination of colors in the mottling of the product may be attained by preparing the composition with intermixed concretions or lumps of fibrous material of different colors in the manner hereinafter set forth.

When coloring matter is to be used in the composition, the dry ingredients thereof in variable proportions according to the exemplary formula given above, are first placed together in a container and mixed as hereinbefore described. The desired coloring matter, preferably in the form of a dry coloring pigment, is added and mixed with the dry ingredients before the binder liquid is added thereto. Coloring pigments may be added in proportions from five to twenty per cent of the weight of the dry mixture depending upon the grade and quality of the pigment and the depth of coloring desired in the finished product. After the coloring pigment has been thoroughly mixed with the dry ingredients, the binder liquid is added and the combined materials are then further mixed to attain an even distribution of fibrous materials and coloring matter, after which the plastic composition may be worked or moulded into the desired form.

When working to produce a composition and mottled product embodying a combination of contrasting colors, a separate complete mixture or mass for each of the colors to be included would be prepared in the manner just described. The separately prepared mixtures of different colors are then placed together in a single large container and gently stirred or mixed together to effect an even distribution of the differently colored fibrous concretions or lumps throughout the body of the final mixture. Care should be taken in thus intermixing the consolidated separately prepared mixtures as a too vigorous agitation thereof may cause the differently colored fibrous concretions or lumps to break up or disintegrate, allowing their colors to run together and blend. However, if a blending of the different colors is desired, the consolidated mixtures may and should be agitated vigorously for the purpose of breaking up the fibrous lumps, allowing their colors to run together and blend.

After the separately prepared mixtures have been consolidated and intermixed, producing the final plastic composition or formative mass, the same may be spread over a flooring surface or moulded and worked into the form desired. In either case, the surface treatment after the composition has set and hardened may be substantially the same as that hereinbefore described with respect to the production of flooring. The resulting product with its fibrous concretions or lumps of intermingled contrasting colors will present a beautifully mottled appearance in the surface and throughout the body of the product. If a highly polished surface for the finished product is desired, the same may be varnished or shellacked and waxed similarly to hardwood flooring.

Another novel and unique effect may be produced from a colored mixture or a combination of two or more differently colored mixtures by sifting a contrasting coloring dry pigment thereover in such quantities that after a careful mixing without breaking up the individual concretions or lumps of fibrous materials, each of the concretions or lumps thereof will become thinly coated with said contrasting color. After the composition has been spread out or moulded into form and left to harden and then scraped to expose a new surface, such surface will present an attractive mottled appearance with the individual mottling lumps or concretions therein completely outlined by a hair-line of the contrasting color.

Beautifully marbleized effects may also be produced by the same method of production merely by varying the consistency of the mixture so that the concretions or lumps of fibrous materials will be broken up, as a result of which the finished product will present a smooth surface of unmottled rather than mottled appearance.

Since the composition contains a relatively high percentage of fibrous material, it may be used in the making of various articles of manufacture, either in or upon a mould where mechanical pressure may advantageously be applied, or by initial formation in a solid body which upon setting and hardening may be turned on a lathe to produce the finished article after the manner of the wood-working art. Its use is not therefore limited to the production of flooring or the formation of flat surfaced articles.

Furthermore, variations in the relative quantities or proportions of the different ingredients embodying the composition may be made in the mixture thereof for the purpose of attaining different effects in the finished products without departing from the spirit and scope of this invention and I therefore do not limit myself to the specific proportions of the ingredients as given in the formula hereinbefore set forth.

Having thus described my invention, what I claim as new and desire to secure by Letters Patent of the United States is:

1. A composition product consisting of a vegetable fibrous material, a mineral fibrous material, a dry cementing material and a liquid binder solution mixed together in proportions producing a plastic mass composed almost entirely of soft concretions or lumps of the fibrous materials held together by the binding materials substantially as described.

2. An improved product or article of manufacture, consisting of a mixture of a wood, fibre or wood-flour with proportions of asbestos fibre and caustic calcined magnesia, to which a liquid binder solution of magnesium chloride is added slowly in sufficient quantity to produce a plastic mass composed of soft concretions or lumps of the fibrous materials substantially as described.

3. An improved product or article of manufacture, consisting of a mixture of a vegetable fibrous material with asbestos fibres and caustic calcined magnesia in relative proportions of approximately thirty, twenty-five and forty-five per cent by weight respectively of the mixture and a liquid binder solution of magnesium chloride added thereto in sufficient proportion to produce a plastic mass composed almost entirely of soft concretions or lumps of the fibrous materials which may be worked or moulded into the desired form, substantially as described.

4. The herein described method of producing a composition flooring or other article of manufacture, characterized by mixing together a vegetable fibrous material, fibered asbestos and caustic calcined magnesia in relative proportions of approximately 30, 25 and 45 per cent by weight respectively of the mixture and adding slowly thereto a liquid binder solution of magnesium chloride in sufficient quantity to produce a plastic mass composed almost entirely of soft concretions or lumps of the fibrous materials, spreading or moulding the mass into the desired form, allowing the same to set and harden and then treating the surface thereof, substantially as described.

5. A method of producing a composition flooring or other article of manufacture having a mottled surface appearance, characterized by mixing together a vegetable fibrous material, fibered asbestos and caustic calcined magnesia in relative proportions of 30, 25 and 45 per cent by weight respectively of the mixture, adding to such mixture a liquid binder solution of magnesium chloride in sufficient quantity to produce a plastic mass composed of soft concretions or lumps of the fibrous materials with said fibrous concretions or lumps evenly distributed therein, spreading or moulding the plastic mass into the form desired, allowing the same to set and harden and then scraping or sanding the surface thereof to expose a new surface in which the fibrous concretions will resultingly appear in mottling effect.

6. The herein described method of producing a composition flooring or other article of manufacture which consists in mixing together relative proportions of wood-fibre or wood-flour, fibered asbestos and caustic calcined magnesia and adding slowly thereto a liquid binder solution of magnesium chloride in sufficient quantity to produce a plastic mass composed almost entirely of soft concretions or lumps of the fibrous materials held together by the binding materials, spreading or moulding the mass into the desired form, allowing the same to set and harden and then scraping or sanding the surface thereof to expose a new surface, substantially as described.

In testimony whereof, I have signed my name to this specification.

ALGER J. SLOSSER.